No. 606,880. Patented July 5, 1898.
S. F. SAVIDGE.
CAKE BOX, &c.
(Application filed Aug. 6, 1897.)
(No Model.)
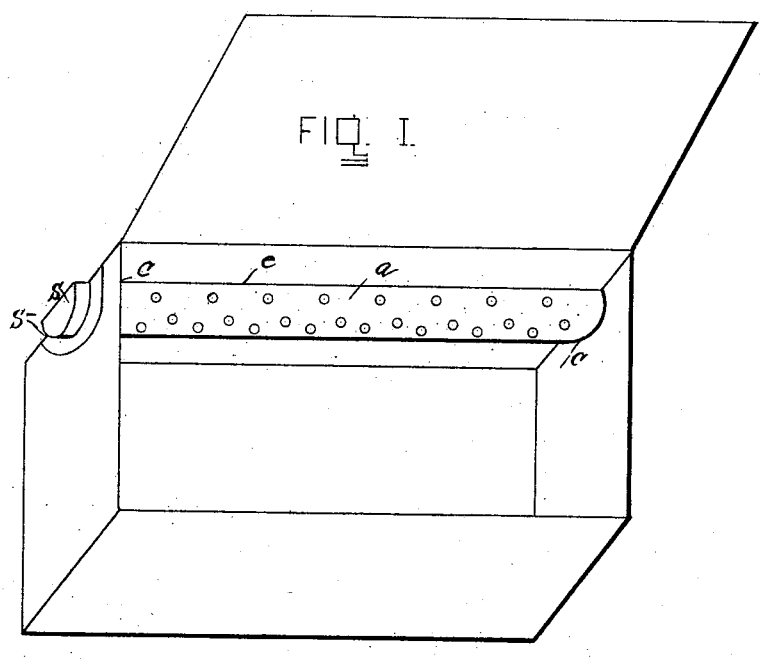
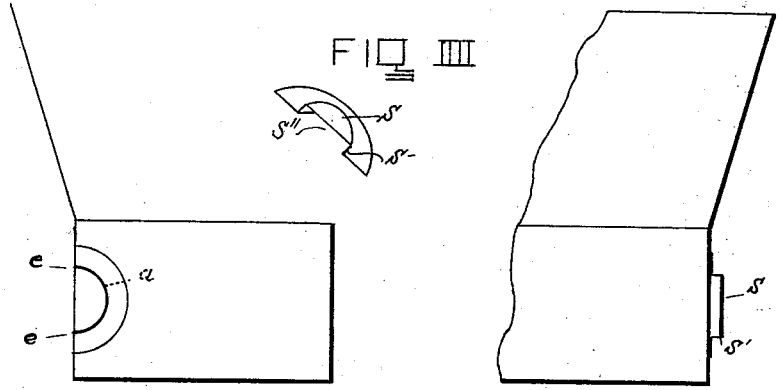
WITNESSES
E. Perry.
W. C. Boise
INVENTOR
Susan F. Savidge
BY
George H. Huntington
ATTORNEY
THE NORRIS PETERS CO., PHOTO-LITHO., WASHINGTON, D. C.

UNITED STATES PATENT OFFICE.

SUSAN F. SAVIDGE, OF ASBURY PARK, NEW JERSEY.

CAKE-BOX, &c.

SPECIFICATION forming part of Letters Patent No. 606,880, dated July 5, 1898.

Application filed August 6, 1897. Serial No. 647,298. (No model.)

*To all whom it may concern:*

Be it known that I, SUSAN F. SAVIDGE, a citizen of the United States, residing at Asbury Park, in the county of Monmouth and State of New Jersey, have invented an Improvement in Cake-Boxes, of which the following is a specification.

This invention relates to boxes for containing food, especially those boxes which are made of metal or tin, wherein the food is apt to sweat and become moist, its object being to provide a suitable means for ventilating the box by which sufficient air is admitted to keep the food contained in the said box thoroughly dry.

In the accompanying drawings, which form a part of this specification, my invention is fully illustrated with similar letters of reference to indicate corresponding parts, as follows:

Figure 1 represents a perspective view showing a semicircular tube, as $a$, secured to the back of the box with suitable openings at either end, so that a current of air may pass directly through the tube. The tube referred to is perforated with holes, thus admitting sufficient air to the inside of the box, as described. Fig. 2 represents an end view of the box, showing more perfectly the semicircular tube which passes through the box at its back; and Fig. 3 represents a back view of a portion of the box to show the hood which covers the end opening of the semicircular tube. Fig. 4 represents a perspective view of the hood $s$, which is soldered to each end of the box, covering the end of the perforated semicircular tube $a$, leaving an air-space in the back, as $s'$, at either end, which permits the free circulation of air. Fig. 2 also illustrates a perspective view of the hood $s$, showing its flanged portion by which it is soldered to the box and to the open back portion $s'$, which admits the air to the tube $a$.

I am aware that ventilated boxes have been heretofore made—such as cheese-boxes, &c.—where similar perforations are made in the side of the box to admit the air; but where such boxes are used and stored with cake they are found to be wholly insufficient, and should the perforations be made larger all sorts of insects and dust would be admitted to the food. Another objection to such perforations is that the cake or bread when piled against them on the inside will invariably close the air-passages and they are absolutely of no use.

To construct my improved cake-box, I usually employ a semicircular piece of perforated tin, as $a$, extending longitudinally across the back of the box. This piece extends the entire length and is soldered to the box at each end, as $c$, with its edges soldered to the back of the box, as $e$. A semicircular piece is then cut from each end of the box the size of the semicircular perforated tube, thus creating a passage for the air directly through the entire length of the box, the air being permitted to pass into the box through the semicircular tube.

Of course the location of the semicircular perforated piece $a$ need not necessarily be confined to the back of the box, as it can be placed either at the bottom or front or across the box. In fact, it might be located longitudinally across one corner of the box so long as the current of air is permitted to pass through without the probability of the perforations becoming closed by crumbs, &c.

At each end of the box, as shown at $s$, Fig. 3, I usually provide a small hood which covers the end opening of the perforated tube $a$, the hood being raised, as shown at $s'$, to admit a sufficient current of air under the hood to supply the tube.

Having thus described my invention, what I claim, and desire to secure by Letters Patent of the United States, is as follows:

1. The combination with a cake-box, of a tube horizontally arranged in, and having external communication at both its ends through two of the walls of, said box, said tube being provided with a series of ventilative perforations opening into said box, substantially as described.

2. The combination with a cake-box, of a tube horizontally arranged in, and having external communication at both its ends through two of the walls of, said box, said tube being provided with a series of ventilative perforations opening into said box and having a cap for each of its ends, substantially as described.

In testimony whereof I have hereunto set my hand this 2d day of August, 1897.

SUSAN F. SAVIDGE.

Witnesses:
WALTER S. KIRKBRIDE,
MARTIN H. SCOTT.